No. 629,013. Patented July 18, 1899.
R. H. & W. A. McNAIR.
THILL COUPLING.
(Application filed Nov. 17, 1898.)
(No Model.)

Witnesses:
H. H. McElhiney.
B. C. Seaton

Inventors:
Robert H. McNair
and William A. McNair,
By Semer G. Wells,
atty.

THE NORRIS PETERS CO., PHOTO-LITHO., WASHINGTON, D. C.

United States Patent Office.

ROBERT HANES McNAIR AND WILLIAM ALEXANDER McNAIR, OF ELSAH, ILLINOIS, ASSIGNORS TO GEORGE W. HERDMAN AND SYLVANUS L. HILL, OF JERSEYVILLE, ILLINOIS.

THILL-COUPLING.

SPECIFICATION forming part of Letters Patent No. 629,013, dated July 18, 1899.

Application filed November 17, 1898. Serial No. 696,691. (No model.)

*To all whom it may concern:*

Be it known that we, ROBERT HANES MC-NAIR and WILLIAM ALEXANDER MCNAIR, citizens of the United States, residing in Elsah, Jersey county, Illinois, have invented an Improvement in Couplings for Thills and Poles, of which the following is a specification.

Figure 1:
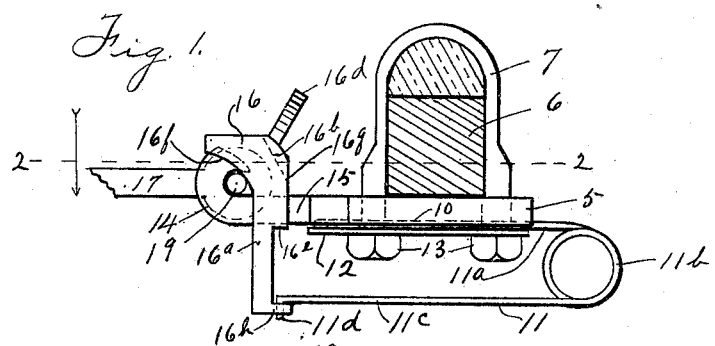
Figure 2:
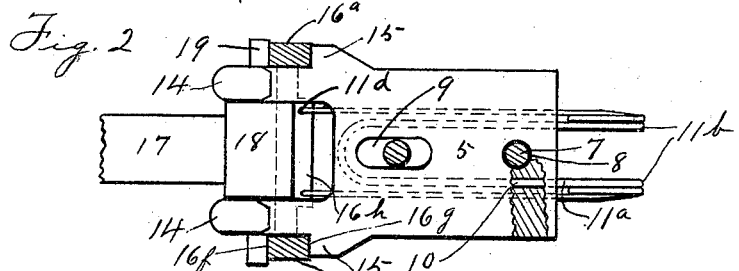
Figure 3:
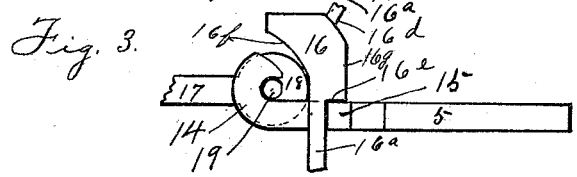
Figure 4:
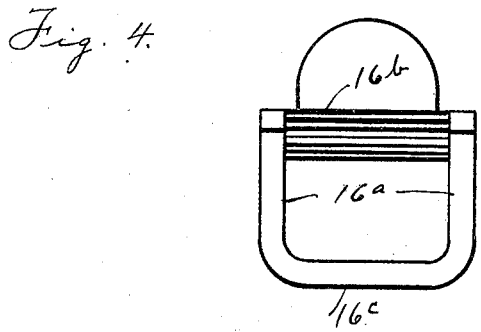

Figure 1 is a side elevation of a coupling for thills and poles constructed in accordance with the principles of our invention, the vehicle-axle being shown in cross-section. Fig. 2 is a horizontal section taken approximately on the line 2 2 of Fig. 1. Fig. 3 is a view analogous to Fig. 1, parts being omitted, said view being drawn to illustrate the operation of uncoupling. Fig. 4 is a front elevation of the vertically-reciprocating yoke.

Our object is to construct a coupling for thills and poles which may be readily uncoupled when it is desired to change from thills to poles, or vice versa, and which will not rattle.

Referring by numerals to the drawings, the base-plate 5 is placed against the lower face of the axle 6 and is held in position by the clip 7. The rear opening 8 fits the end of the clip, and the forward opening 9 is elongated in a direction transversely of the axle in order that the plate may be used with clips and axles of different sizes. A groove 10 is formed in the lower face of the plate 5. The wire spring 11 consists of the central portion $11^a$, the coiled portions $11^b$, the end portions $11^c$, and the hooks $11^d$. The spring 11 is placed in position with the central portion $11^a$ in the groove 10, as shown in dotted lines. The clamping-plate 12 is placed in position below the central portion of the spring with the ends of the clip passing through openings corresponding to the openings in the base-plate, and nuts 13 are screwed upon the ends of the clip to hold the base-plate, the spring, and the clamping-plate securely together. The parallel open bearings 14 extend forwardly from the plate 5, said bearings being open at their upper rear quarters. The shoulders 15 extend laterally from the forward end of the plate 5. The vertically-reciprocating yoke 16 consists of the parallel side pieces $16^a$, the upper cross-piece $16^b$, and the lower cross-piece $16^c$, connecting the ends of the side pieces together, and the handle $16^d$ extending upwardly from the upper cross-piece. Shoulders $16^e$ are formed upon the rear sides near the centers of the side pieces, and the upper ends of said side pieces are enlarged, thus producing downwardly-pointing wedges having the inclined front faces $16^f$ and the vertical rear faces $16^g$. When the yoke is placed in the uncoupled position, the bearings 14 extend through the yoke, and the shoulders $16^e$ rest upon the shoulders 15. A flange $16^h$ extends backwardly from the lower cross-piece $16^c$, and vertical bearings are formed through said flange to receive the hooks $11^d$. The tension of the spring 11 pulls downwardly on the yoke. The rear end of the thill or pole is represented by the bar 17, having the head 18, which fits between the bearings 14 and the pin 19, passing through the head and projecting from both sides of said head. When the yoke 16 is in position, with the shoulders $16^e$ resting upon the shoulders 15, as shown in Fig. 3, the ends of the pin 19 will pass downwardly in front of the inclined faces $16^f$ into the open bearings. By pressing forwardly on the handle $16^d$ the shoulders are disengaged and the tension of the spring 11 draws the yoke downwardly, thus bringing the rear faces $16^g$ against the front faces of the shoulders 15 and bringing the inclined faces $16^f$ against the ends of the pin 19. In this position the upper ends of the side pieces of the yoke serve as wedges to press the ends of the pin 19 into the open bearings, as shown in Fig. 1. Then the thill or pole cannot be uncoupled until the yoke is manually elevated into the position shown in Fig. 3. The pin 19 cannot rattle in the bearings.

The essentials are a plate designed to be attached to the axle, open bearings carried by the plate, shoulders on the plate, and a vertically-reciprocating spring-actuated yoke having wedge-shaped portions engaging said shoulders and pressing toward said open bearings.

We claim—

1. A coupling for thills and poles, consisting of a base-plate, parallel open bearings extending forwardly from the plate, shoulders extending laterally from the forward end of the plate, and a spring-actuated vertically-reciprocating yoke having wedge-shaped portions to engage said shoulders, substantially as specified.

2. A coupling for thills and poles, consisting of a base-plate having a rear opening to receive the rear end of a clip and having an elongated forward opening to receive the forward end of a clip, a clip operating in said openings to connect the base-plate to an axle, parallel open bearings extending forwardly from the base-plate, shoulders extending laterally from the forward end of the plate, and a spring-actuated vertically-reciprocating yoke having wedge-shaped portions to engage said shoulders, substantially as specified.

3. A coupling for thills and poles consisting of a base-plate, parallel open bearings extending forwardly from the base-plate, shoulders extending laterally from the forward end of the base-plate, a spring-actuated vertically-reciprocating yoke having wedge-shaped portions to engage the front faces of said shoulders and having shoulders at the lower ends of said wedge-shaped portions to rest upon the first-mentioned shoulders when the wedge-shaped portions are not in use, substantially as specified.

4. A coupling for thills and poles consisting of a base-plate, parallel open bearings extending forwardly from the base-plate, shoulders extending laterally from the forward end of the base-plate, a spring-actuated vertically-reciprocating yoke having wedge-shaped portions to engage the front faces of said shoulders and having shoulders at the lower ends of said wedge-shaped portions to rest upon the first-mentioned shoulders when the wedge-shaped portions are not in use, and a handle extending upwardly from the yoke, substantially as specified.

5. A coupling for thills and poles, consisting of a base-plate having the groove 10 formed in its lower face, the wire spring 11 operating in said groove, the clamping-plate placed against the spring, a clip holding the clamping-plate and base-plate in position, parallel open bearings extending forwardly from the plate, shoulders extending laterally from the forward end of the plate, a vertically-reciprocating yoke connected to said spring and having wedge-shaped portions to engage said shoulders, substantially as specified.

ROBERT HANES McNAIR.
WILLIAM ALEXANDER McNAIR.

Witnesses:
HARRY KEYSER,
H. E. HOWARD.